United States Patent
Heitz et al.

(10) Patent No.: US 9,150,237 B2
(45) Date of Patent: Oct. 6, 2015

(54) LIGHTWEIGHT STEERING COLUMN OF FIBRE COMPOSITE MATERIAL

(71) Applicants: Thomas Heitz, Mauren (LI); Sebastian Regner, Lindau (DE); Arne Schacht, Feldkirch (AT)

(72) Inventors: Thomas Heitz, Mauren (LI); Sebastian Regner, Lindau (DE); Arne Schacht, Feldkirch (AT)

(73) Assignee: THYSSENKRUPP PRESTA AG, Eschen (LI)

( * ) Notice: Subject to any disclaimer, the term of this patent is extended or adjusted under 35 U.S.C. 154(b) by 0 days.

(21) Appl. No.: 14/391,784

(22) PCT Filed: Mar. 14, 2013

(86) PCT No.: PCT/EP2013/000776
§ 371 (c)(1),
(2) Date: Oct. 10, 2014

(87) PCT Pub. No.: WO2013/152825
PCT Pub. Date: Oct. 17, 2013

(65) Prior Publication Data
US 2015/0068352 A1    Mar. 12, 2015

(30) Foreign Application Priority Data
Apr. 10, 2012 (DE) .......... 10 2012 007 005

(51) Int. Cl.
*B62D 1/189* (2006.01)
*B62D 1/16* (2006.01)
(Continued)

(52) U.S. Cl.
CPC .............. *B62D 1/16* (2013.01); *B29C 45/0005* (2013.01); *B29C 45/0053* (2013.01);
(Continued)

(58) Field of Classification Search
CPC ............ B62D 1/16; B62D 1/18; B62D 1/187; B62D 1/189; B29C 45/14786; B29C 45/0005
USPC ...................... 74/492, 493; 280/775, 779, 780
See application file for complete search history.

(56) References Cited

U.S. PATENT DOCUMENTS 4,577,736 A * 3/1986 Bongers et al. ............... 188/371
4,589,679 A * 5/1986 Wackerle et al. ............. 280/777
(Continued)

FOREIGN PATENT DOCUMENTS

DE    3446749 A1 * 7/1986 ............... B62D 1/18
DE    3610775 A1 * 10/1987 ................ F16D 1/02
(Continued)

OTHER PUBLICATIONS

German Language International Search Report for International patent application No. PCT/EP2013/000776; mailing date Jul. 4, 2013.
(Continued)

*Primary Examiner* — Keith Frisby
(74) *Attorney, Agent, or Firm* — ThyssenKrupp North America, Inc.

(57) ABSTRACT

The invention relates to a steering column for a motor vehicle comprising a steering spindle, which is mounted rotatably about its axis in a steering spindle bearing unit, a holding part, which is designed to connect the steering spindle bearing unit directly or indirectly to the body of the motor vehicle, wherein at least one of the components of the steering column is at least partially formed from a material that contains reinforcing fibers, wherein the reinforcing fibers are arranged along paths on a wall surface and, by means of multiple holding fibers, which run at an angle that is greater than 0° in relation to the paths of the reinforcing fibers and enclose the reinforcing fibers, are fixed on the wall surface.

10 Claims, 9 Drawing Sheets

(51) Int. Cl.
  B29C 70/34 (2006.01)
  B29C 70/54 (2006.01)
  B29C 45/00 (2006.01)
  B29C 45/14 (2006.01)
  B29C 45/16 (2006.01)
  B29K 105/08 (2006.01)
  B29K 267/00 (2006.01)
  B29L 31/30 (2006.01)

(52) U.S. Cl.
  CPC ...... *B29C 45/14786* (2013.01); *B29C 45/1671* (2013.01); *B29C 70/34* (2013.01); *B29C 70/543* (2013.01); *B29K 2105/0827* (2013.01); *B29K 2267/00* (2013.01); *B29L 2031/30* (2013.01); *B62D 1/189* (2013.01)

(56) References Cited

U.S. PATENT DOCUMENTS

| | | | | |
|---|---|---|---|---|
| 8,882,147 | B2* | 11/2014 | Schnitzer et al. | 280/775 |
| 2002/0081147 | A1* | 6/2002 | Gianaris et al. | 403/223 |
| 2010/0064839 | A1* | 3/2010 | Schnitzer et al. | 74/492 |
| 2013/0298719 | A1* | 11/2013 | Schnitzer et al. | 74/493 |

FOREIGN PATENT DOCUMENTS

| | | | | |
|---|---|---|---|---|
| DE | 19809264 | A1 | | 9/1999 |
| DE | 10155891 | B4 | | 9/2002 |
| DE | 10242527 | A1 | | 4/2003 |
| DE | 102005034952 | B3 | | 2/2007 |
| DE | 102012000633 | | * | 7/2013 |
| EP | 0091671 | B1 | | 10/1983 |
| JP | 59084666 | A | * | 5/1984 ............... B62D 1/16 |
| JP | 59092255 | A | * | 5/1984 ............... B62D 1/18 |
| JP | 59096058 | A | * | 6/1984 ............... B62D 1/18 |
| JP | 63140139 | A | * | 6/1988 ............... F16F 7/12 |

OTHER PUBLICATIONS

English Translation of International Search Report for International patent application No. PCT/EP2013/000776; mailing date Jul. 4, 2013.

English Abstract of GB counterpart (GB2379637 (A1)) to German patent application No. DE10242527 (A1). Note that an English abstract of DE10242527 (A1) was NOT available.

English Abstract of DE 19809264 A1.

English Abstract of WO counterpart (WO2007009760 (A1)) to German patent application No. DE102005034952 (B3). Note that an English abstract of DE102005034952 (B3) was NOT available.

English Abstract of GB counterpart (GB2368894 (A)) to German patent application No. DE10155891(A1). Note that an English abstract of DE10155891(A1) was NOT available.

English Abstract of EP 0091671 (B1).

* cited by examiner

Fig. 21

LIGHTWEIGHT STEERING COLUMN OF FIBRE COMPOSITE MATERIAL

CROSS REFERENCE TO RELATED APPLICATIONS

This application is a U.S. National Stage Entry of International Patent Application Serial Number PCT/EP2013/000776, filed Mar. 14, 2013, which claims priority to German patent application no. 102012007005.5, filed Apr. 10, 2012.

FIELD

The invention relates to a steering column assembly for a vehicle and to a method for producing components for such a steering column assembly.

In particular, the invention relates to a steering column assembly which is adjustable in its length and/or inclination.

BACKGROUND

In cases in which they are used, steering column assemblies or steering columns of the generic type are fitted in a motor vehicle and transfer the torques applied to a steering wheel by the driver into a steering system of the vehicle. Furthermore, in cases in which they are used, steering columns have to withstand various loads, in particular in the event of a collision of the vehicle with an obstacle—the crash case.

DE 10 2005 034 952 B3 discloses for example a steering column which is adjustable in its height and its inclination. A steering spindle is rotatably mounted in an adjusting part, which is also referred to as the casing unit. The casing unit is held in a holding part and the holding part is mounted in a holding clip, which can be fastened to a vehicle body. For adapting the position of the steering spindle, or a steering wheel to be fastened thereto, a clamping system is provided, adjustable by an adjusting lever between an open position and a closed position. In the open position of the clamping system, the casing unit can be displaced in its longitudinal direction with respect to the holding part and at the same time the holding part can be swiveled in its direction of inclination with respect to the holding clip about a swivel axis. In the closed position of the clamping system, the steering spindle is fixed with respect to the holding clip fixed to the body. Such steering columns and clamping systems are known in various embodiments in the prior art.

In a way corresponding to the prior art, the components of such steering columns are made of cast steel, aluminium or magnesium.

There is a general desire for such steering columns to be of a particularly lightweight form. For this purpose, DE 101 55 891 B4 proposes generally making the casing unit (=the central bearing tube) from a thermoplastic or a thermoplastic tube with a glass-fibre or carbon-fibre filling. However, how specifically such a bearing tube may be formed is left open by the disclosure.

EP 0 091 671 B1 discloses a safety steering column, in which a tube part of the steering spindle is formed in one piece with a rigid steering column portion of fibre-reinforced plastic. It is disclosed there that the steering column is produced by a technique of winding around a core, for example of rigid polyurethane foam. In this case, however, the possibilities for the design of the steering column are greatly restricted.

The published patent application DE 102 42 527 A1 discloses a steering column protective housing consisting of a polymer composite material. The steering tube and the mounting brackets are formed by unidirectional strands of fibres that are arranged within a composite material. Mounting brackets may be formed by injection moulding with the use of short fibres, while the steering tube is formed in a compression-moulding process, which includes the use of longer or continuous or oriented fibres. The fibres are usually arranged lying alongside one another and perpendicular to one another or alongside one another and parallel to one another within an adjacent layer of fibres.

DE 198 09 264 A1 discloses a fibrous nonwoven arrangement and a method for producing a preform. In this method, nonwoven layers consisting of unidirectional continuous fibres arranged alongside one another are laid on two-dimensional hotmelt adhesive formations and sewn together with them. Subsequently, to produce the blank for a fibre composite material component, the fibrous nonwoven arrangement is heated, compression-moulded, cooled and demoulded. The preforms produced are then placed into a component thermoforming mould that is not described here, where for example a synthetic resin matrix is fed in and the curing of the composite takes place to form the finished fibre composite material component. The stress profiles in the components can be determined by analytical and numerical methods of calculation. The reinforcing element structure takes these calculations into account, in that the reinforcing fibres are arranged parallel to the stress profiles and the thickness of the component is adapted to the loads. It is precisely at this point that the previously mentioned conventional semifinished fibrous products reach their limits. The reinforcing fibres must lie absolutely parallel to the direction of loading, since only in this way can the full potential of their capability be exploited. Reinforcing fibres should be neither twisted nor undulating in the component, since weak points are thereby implicated. To be able to meet these requirements for the reinforcing element, methods that ensure a defined position of the reinforcing fibres are needed.

The problem addressed by the invention is that of providing a lightweight steering column with which there is a high degree of freedom of design.

DETAILED DESCRIPTION

The problem is solved by a steering column corresponding to patent claim 1. Advantageous developments of the invention are presented in the subclaims.

A steering column for a motor vehicle comprising:
a steering spindle, which is mounted rotatably about its axis in a steering spindle bearing unit,
a holding part, which is designed to connect the steering spindle bearing unit directly or indirectly to the body of the motor vehicle,
wherein at least one of the components of the steering column is at least partially formed from a material that contains reinforcing fibres,
which is characterized in that the reinforcing fibres are arranged in a plane not only stretched out but also in an angle-independently deposited form over prescribed paths and are fixed by means of multiple holding fibres, which run at an angle that is greater than 0° in relation to the paths of the reinforcing fibres and enclose the reinforcing fibres, on a backing comprising backing fibres, which are connected to one another in a weaving process, and said reinforcing fibres form a reinforcing element, offers the advantage that the reinforcing fibres can be oriented in the directions along which the forces are at the greatest in the operating state of the steering column. This allows a high degree of stiffness to be achieved, even for various cases of use and variations of design of the steering column.

In a preferred way, the reinforcing fibres are formed from carbon fibres or as aramid fibres or as glass fibres or a mixture of these fibres. In this case, preferably multiple fibres, which may also be referred to as filaments, are grouped into rovings and processed together. For the purposes of the invention, the terms filament and fibre are used synonymously. A roving is a grouping of filaments which however have not been connected to one another to form a yarn, for example by spinning. Correspondingly, as a difference from rovings, in the case of yarns the fibres are connected to one another. A thread is understood as meaning a yarn with a limited length.

To increase the strength of the component of the steering column, it should be endeavoured to orient the reinforcing fibres as straight as possible, in particular to deflect them as little as possible in arcs. Arcs with very small radii, for example in the range of below 1 mm, should as far as possible be avoided completely. At least, such arcs should be avoided along the main directions of force that occur in the component during the use of the component.

The holding fibres may be formed by threads which are made from polyester or else other materials. In this case, yarns such as are known in the textiles industry may also be used as holding fibres. The holding fibres enclose the reinforcing fibres in order to fix the reinforcing fibres in a spatial position in relation to one another. With preference, the fixing takes place by upper holding fibres, which are linked or connected to lower holding fibres and in this way enclose the reinforcing fibres.

The backing, which may also be referred to as an embroidery base, consists of backing fibres that are connected to one another in a weaving process. Instead of a weaving process, some other process for connecting fibres, preferably without additional materials, may also be used, as represented for example by braiding or knitting. All of these processes are subsumed within this disclosure by the term weaving process.

The backing fibres may also be formed from polyester or else other materials. In this case, yarns such as are known in the textiles industry may also be used for forming the backing fibres. The use of additional materials, such as for example synthetic resins, for connecting the backing fibres to form the backing is indeed possible, but has disadvantages.

It is also conceivable and possible to connect oriented backing fibres which are not connected to one another by yarns that serve as connecting fibres and to form the backing in this way. This application case should be preferred whenever the backing fibres are to absorb additional forces. In this case, the backing fibres should be contained in the backing with fewest possible deviations from a straight or spline-shaped extent, with radii of more than 2 mm, and in particular fewest possible deflections. For fixing, the connecting fibres are then provided, oriented such that the backing fibres only have small deviations from a straight course or alternatively have a course that is spline-shaped and the radii of which are greater than 2 mm.

In one embodiment of the invention, backing fibres and/or the connecting fibres of the backing form holding fibres. With the use of separate upper holding fibres, the enclosing of the reinforcing fibres with the holding fibres can be brought about. Also when a backing is used, separate lower holding fibres may also be additionally provided, connected to separate upper holding fibres to form the enclosure. Parts of the weave of the backing are in this case enclosed by the holding fibres that enclose the reinforcing fibres.

If the backing is not designed for absorbing additional forces, or if the forces to be absorbed in the case of use of the steering column exceed corresponding values, at least one nonwoven scrim may be provided, comprising parallel-oriented nonwoven fibres which are connected to one another and can absorb additional forces in the case of use of the steering column. For forming the component of the steering column, preferably the reinforcing fibres running in paths are arranged on the surface of the at least one nonwoven scrim. In this case, it is also advantageous to provide at least two nonwoven scrims, between which the reinforcing fibres running in paths are arranged.

In the case of the nonwoven scrims being used, the nonwoven fibres are oriented as parallel as possible and connected to one another by connecting fibres. The nonwoven fibres assume the function of absorbing forces in the finished component. The connecting fibres only assume the function of stabilizing the nonwoven scrim for further processing. As an alternative to nonwoven scrims, woven fabrics in which the woven fibres are connected to one another by classic weaving technology may also be used. The more frequent deflections of all the fibres in the woven fabric in comparison with the nonwoven scrim means that, when woven fabrics are used, only lower forces can be transferred or absorbed. Both nonwoven fibres and woven fibres preferably consist of carbon, aramid or glass. The choice whether a nonwoven scrim or a woven fabric is to be used is determined by the forces to be absorbed in the case of use of the steering column.

To increase the stiffness in the finished component, in the case where at least two nonwoven scrims are used, the directions of the nonwoven fibres respectively oriented parallel to one another in a scrim vary from scrim to scrim. Advantageously, the angle that the nonwoven fibres assume in relation to one another is preferably in a range from at least 10° to at most 80°. Further preferred are angles in the range from 20° to 50°. In this case, the angles of the fibres of two directly neighbouring nonwoven scrims in relation to one another should be less than 60°.

In a further step, the structural unit may be impregnated with a curable resin and, after curing, forms the component of the steering column that contains the reinforcing fibres.

The problem addressed by the invention is solved by a method for producing a steering column corresponding to patent claim 6. In patent claim 7, an advantageous development of the invention is presented. Further advantageous developments are presented in the subclaims. The steering column according to the invention comprises:

a steering spindle, which is mounted rotatably about its axis in a steering spindle bearing unit,
  a holding part, which is designed to connect the steering spindle bearing unit directly or indirectly to the body of the motor vehicle, wherein at least one of the components of the steering column is formed as a fibre composite component. In this case, the method according to the invention comprises the following steps:

a) positioning a backing, consisting of backing fibres which are connected to one another in a weaving process,
b) positioning reinforcing fibres angle-independently along prescribed paths of stress profiles on the surface of the backing and fixing the reinforcing fibres with holding fibres in a sewing or embroidering process to form a reinforcing element;

with preference comprising c) applying the reinforcing element to at least one nonwoven scrim, comprising respectively parallel-oriented nonwoven fibres which are connected to one another to form a reinforcing package;
d) introducing the reinforcing element or, if present, the reinforcing package into a mould for forming the topology of the reinforcing element or, if present, the reinforcing package;
e) filling the reinforcing element or, if present, the reinforcing package with a curable resin;
f) curing the resin and forming the fibre composite component;
g) fitting the steering column while incorporating the fibre composite component in the steering column.

The topology of the formed fibre composite component, which consists of the reinforcing fibres, the backing and the at least one nonwoven scrim and the cured resin, can be easily adapted by the method to the desired design and/or the requirements for the steering column in the case in which it is used, while results from model calculations can be effectively implemented in a reinforcing fibre structure. Work is preferably performed with an automatic embroidering machine, which scans the course of the fibres and, in a way corresponding to the software model, sews reinforcing fibres onto a backing material in accordance with the optimum embroidery pattern.

The following advantages are obtained in comparison with other production methods:

angle-independent positioning: individual fibres can be arranged as desired, it being possible for the depositing angle of an individual fibre to be varied along the fibre between 0° and 360°. The automatic embroidering machine positions and fixes the fibre, which is typically unwound from a spool, continuously along the fibre on prescribed paths, for which no limits are set. Fibre arrangements are consequently not restricted to fibres being arranged parallel to one another or in straight paths,
  different component thicknesses can be produced by repeated oversewing of the same position,
  great positioning accuracy and
  near-net-shape reinforcing elements reduce scrap and costs.

The method is outstandingly suitable for more complex reinforcing element structures with specific local reinforcements, as are desired in steering columns In particular, apart from the reinforcements by the reinforcing fibres, reinforcements may also be represented by geometrical structures, such as for example beads or grooves in the topology. In this way, an optimum combination of the properties of the reinforcing fibres with the properties of the backing and the at least one nonwoven scrim and the cured resin is achieved.

To shorten the process chain, it is advantageous for forming the fibre composite component to position one or more functional elements at predefined locations in a method step before the filling of the reinforcing package with a curable resin, in order for these functional elements to be connected to the reinforcing fibres by the then-following method steps in order to form a one-piece component with the fibre composite component. Metal inlays, which support the swivel axis or have possibly necessary toothings for the fixing device, may be used here for example.

It is also conceivable and possible to connect one or more functional elements at predefined locations to the backing and only after that to fasten the reinforcing fibres to the backing. A combination with functional elements that are incorporated after the connection of the reinforcing fibres to the backing in the way described above is also conceivable and possible.

Elements that are intended for supporting functions, such as metal inlays with bores for screwing to further components or elements with sliding guides or elements with toothings or other form-fitting elements, may be used as functional elements. Functional elements for passing on electric current, sensor-recording of physical variables, piezoactuators for active acoustic functions on the steering column, as well as other functions, are also conceivable and possible.

Advantageously, the fibre composite component already has the finished shape of the component that is to be fitted into the steering column after removal from the mould in which the forming of the topology and the encapsulation has taken place. For this purpose, the reinforcing package is advantageously trimmed at its periphery with a prescribed circumferential contour before it is introduced into the mould. It is also conceivable and possible to provide the trimming during the introduction of the reinforcing package into the mould. Depending on the application case, it may be advantageous to integrate in the mould cutting tools that allow corresponding contour trimming in the mould. In particular, it is also possible before or during the introduction of the reinforcing package into the mould for the reinforcing package to be provided with clearances that are required for functions of the finished fibre composite component.

Various embodiments of the present disclosure are further illustrated below with reference to the drawing figures.

Figure 1:
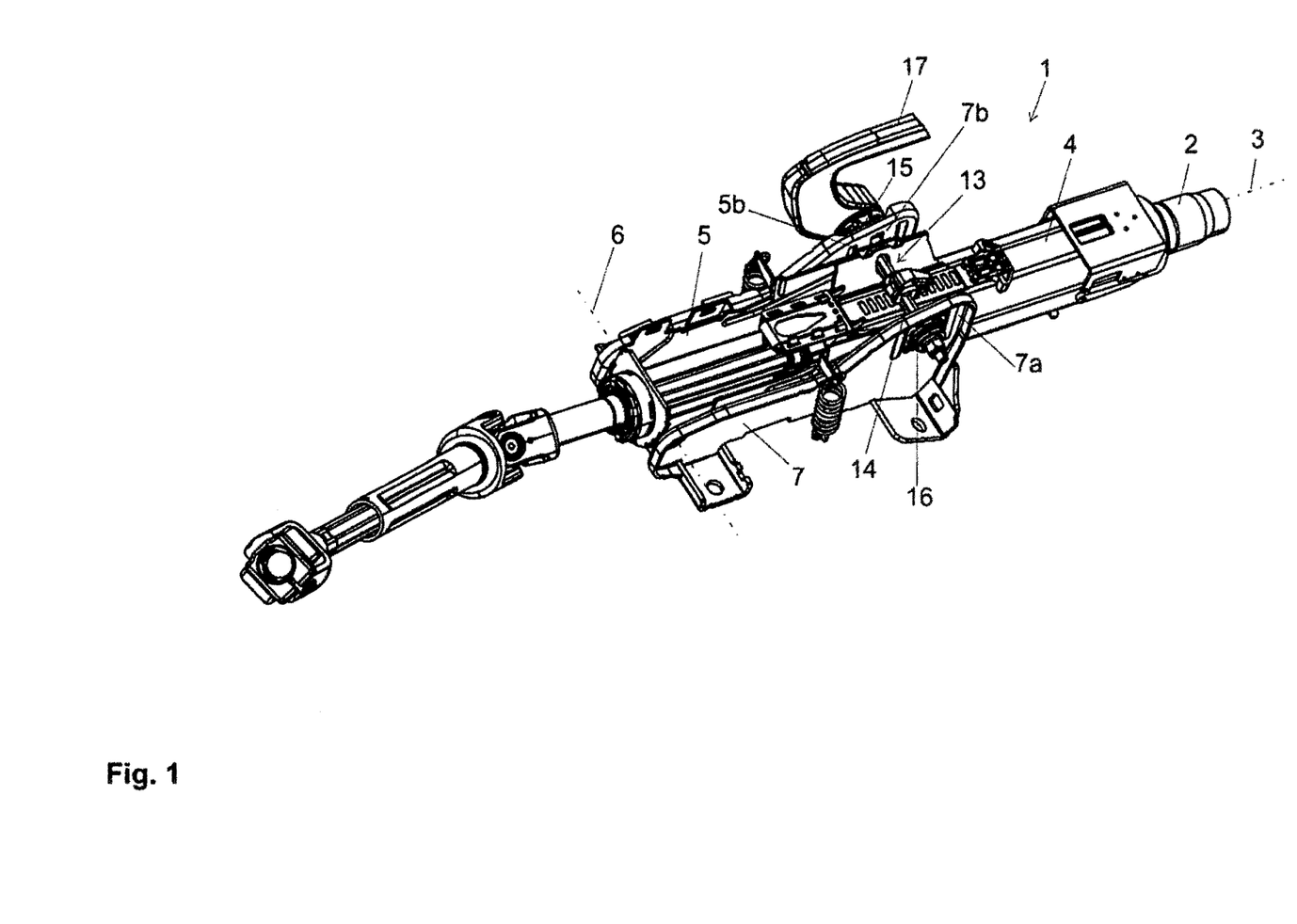
FIG. 1 is an isometric view of an embodiment of a steering column of the present disclosure.
Figure 2:
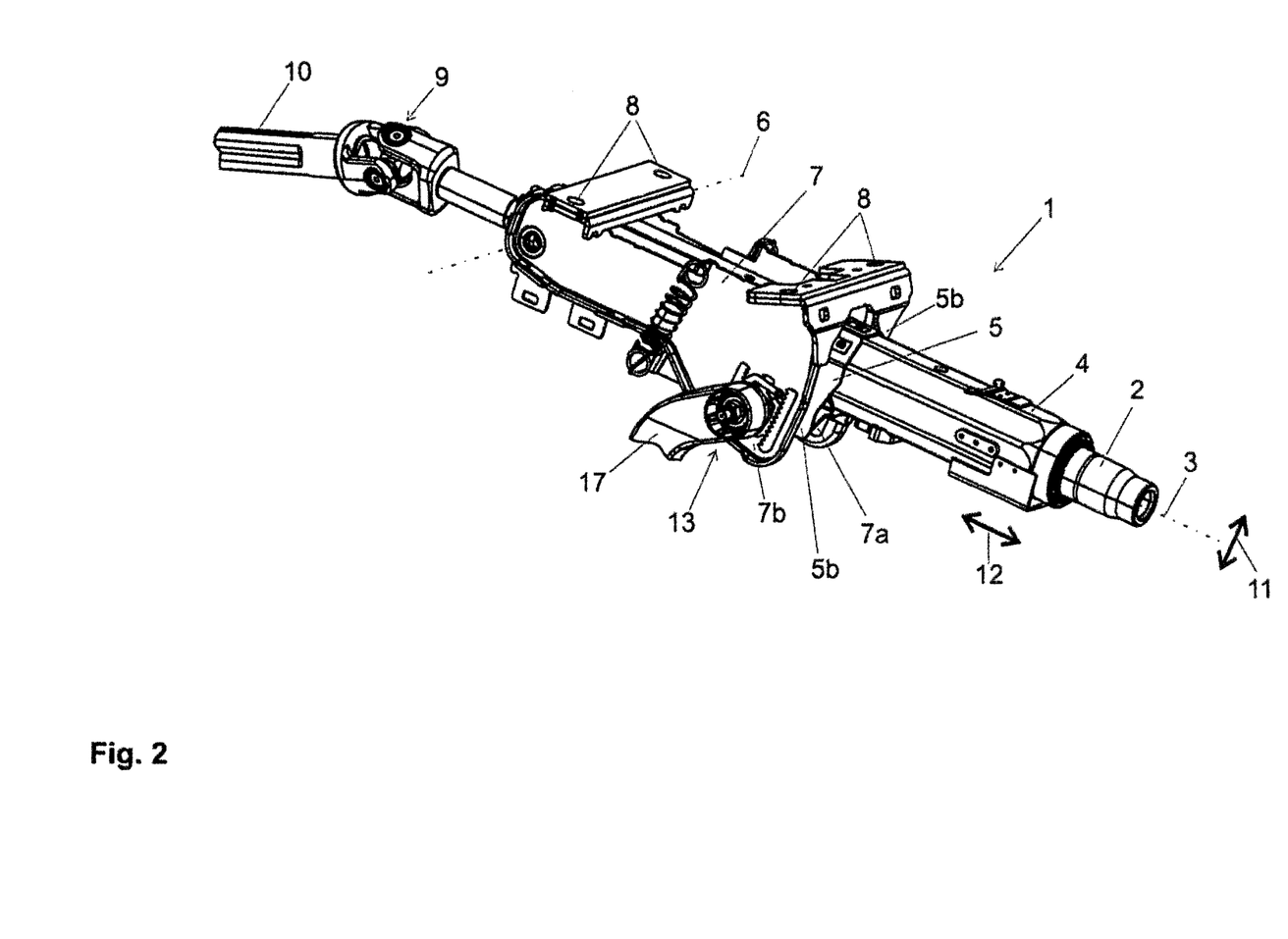
FIG. 2 is an alternate isometric view of the steering column of FIG. 1.

FIGS. 1 and 2 illustrate a steering column 1, according to the invention, which comprises a steering spindle 2, which is mounted rotatably about its axis of rotation 3 in a casing unit 4. The casing unit 4 is guided displaceably along the longitudinal axis 3 of the steering spindle in a swivel lever 5. The swivel lever 5 is mounted in a holding part 7, such that it can swivel about a swivel axis 6. The holding part 7 may be fastened at fastening points 8 to the vehicle body that is not represented. The turning movement introduced by a driver into the steering spindle 2 by way of a steering wheel (not represented) is introduced into the steering gear, not represented, by way of a Cardan joint 9 and further steering shaft parts 10. To increase the comfort of the driver, the steering column can be adjusted in its height in the adjusting direction 11 and in its length in the adjusting direction 12. For this purpose, a fixing mechanism 13 is provided, comprising a clamping apparatus known in the prior art. The clamping apparatus has a clamping bolt 14, a cam mechanism 15, a counter-thrust bearing 16 and a clamping lever 17. By turning the clamping lever 17, the two cams of the cam mechanism 15 are turned with respect to one another and the side plates 7a, 7b are drawn together, whereby a frictional clamping of the side plates 7a, 7b of the holding part 7 to the side faces of the swivel lever 5, and in turn to side faces of the casing unit 4, takes place.

The clamping bolt 14 passes through slots in the side plates 7a, 7b of the holding part 7 and holes in the side faces 5a, 5b of the swivel lever 5. The cam mechanism 15 is arranged on the one end of the clamping bolt and the thrust bearing 16 is arranged on the other end of the clamping bolt. The side plates 7a, 7b as well as the side faces 5a, 5b and the casing unit 4 are arranged between the cam mechanism 15 and the thrust bearing 16.

By turning the adjusting lever 17, the fixing system 13 can be optionally changed over into an open position or a closed position. In the open position, the steering spindle 2, or the steering wheel fastened thereto (not represented in the figures), can be adjusted in its position, in particular displaced in the longitudinal direction 12 and the direction of height or inclination 11.

In the closed position of the fixing system 13, the steering column is fixed in its position. Such steering columns are known in the prior art.

Figure 3:
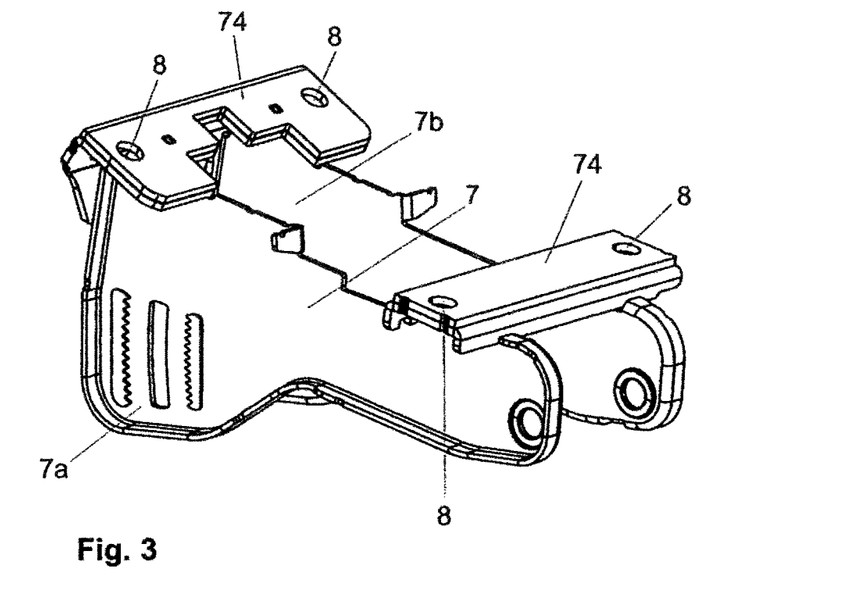
FIG. 3 is an isometric view of an embodiment of a fibre composite holding part of a steering column of the present disclosure.

In FIGS. 1 to 15, the example of the holding part 7 is used to illustrate the provision of the holding part with reinforcing fibres. FIG. 3 shows the holding part 7 in its form ready for fitting. In this respect, firstly an intermediate component 71 is provided. The intermediate component 71 is connected to a further intermediate component 72 in separate method steps to form the holding part 7.

Figures 5, 6:
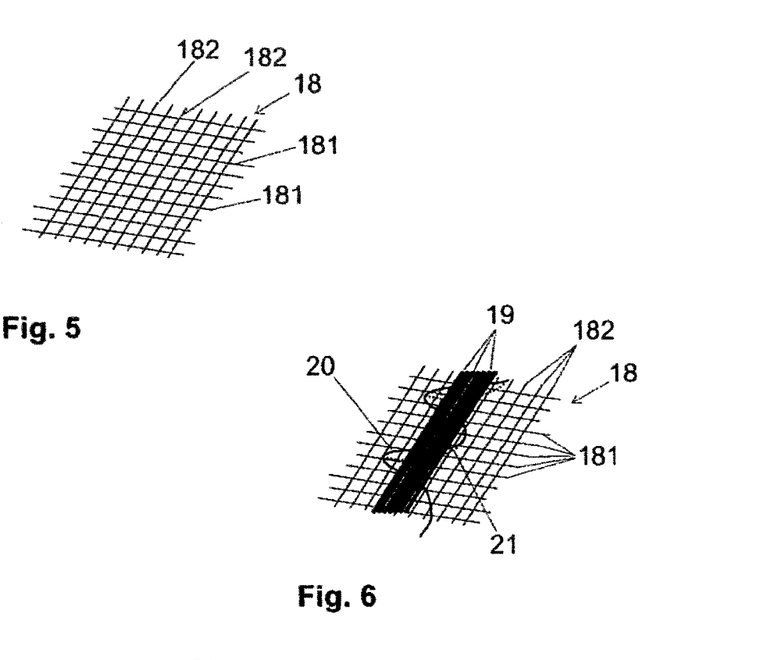
FIGS. 5-9 are schematic representations showing an embodiment of the connection of reinforcing fibres to a backing.
Figure 7:
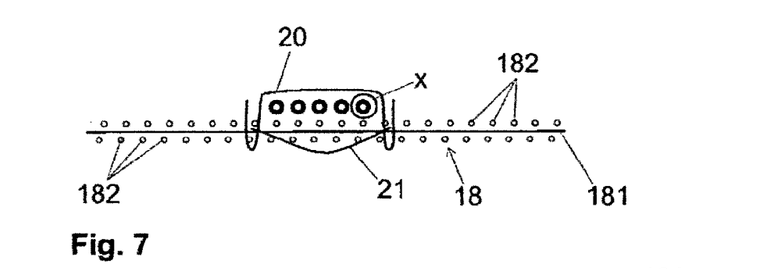
Figure 8:
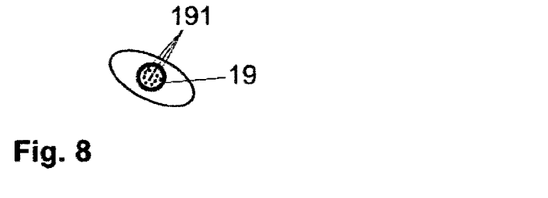

Firstly, a backing 18 consisting of backing fibres 181, 182 is formed. In the example, the backing fibres are connected to one another by a weaving process (cf. FIG. 5). As illustrated in FIGS. 6, 7 and 8, reinforcing fibres 191, which are bundled into rovings 19, are applied to this backing 18 and are connected to the backing by an upper holding thread 20 and a lower holding thread 21. A classic sewing technology serves here as the connecting process. With this technique it is possible to lay reinforcing fibres along stress profiles of a component. Optimally used, this technique can contribute to significant material savings on account of the optimized fibre structure. In this case, the individual reinforcing fibres are not only applied stretched out in the plane but also on any desired paths, so that a desired complex fibre arrangement is achieved. This technology is often also referred to as embroidering technology.

Figure 9:
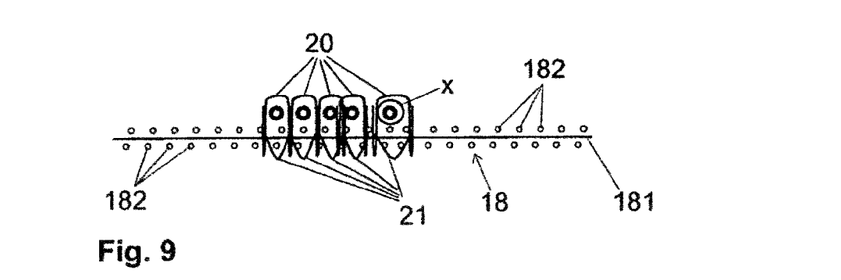
Figure 10:
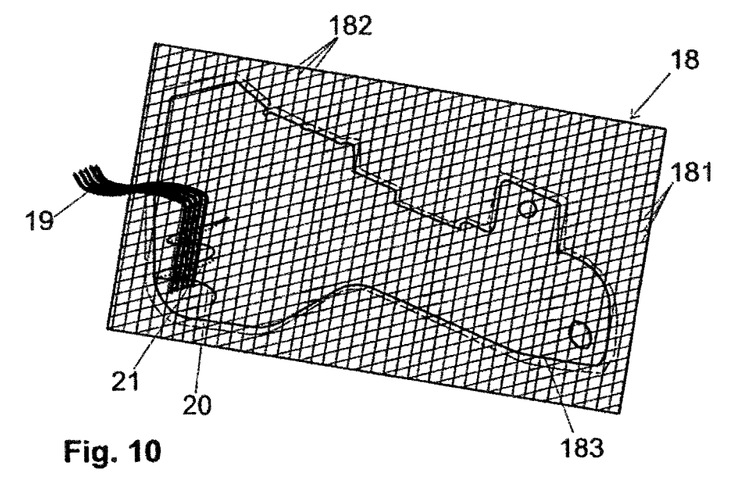
FIGS. 10 and 11 are schematic representations showing a process of the present disclosure for fastening reinforcing fibres to the backing to present the holding part of the steering column.
Figure 11:
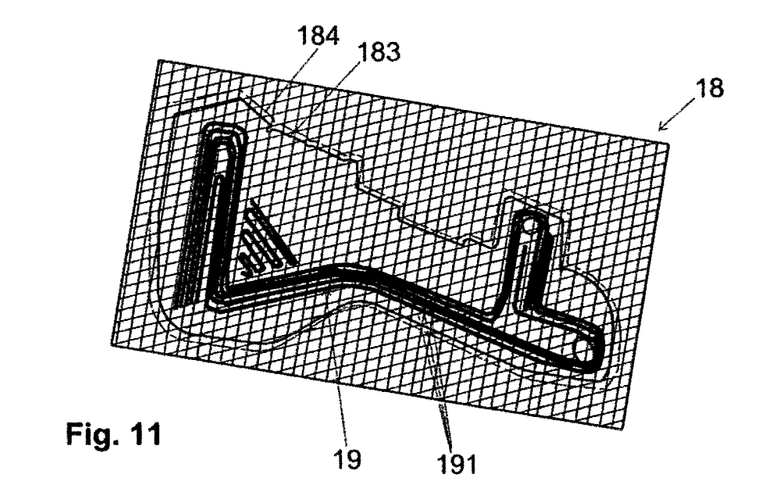

For purposes of illustration, in FIG. 7 the corresponding rovings 19, backing threads 181, 182 and holding threads 20, 21 are shown as pulled wide apart. However, it is envisaged to press the threads firmly on to one another with a certain pretension. This takes place by a pretensioning of the holding threads 20, 21 during the sewing process. In this way, the backing 18 on which the reinforcing fibres 19 are arranged is already given a certain strength. In FIGS. 10 and 11, the application of this technological process to the steering column according to the invention is illustrated. In FIG. 8, the bundling of the reinforcing fibres 191 to form the rovings 19 is illustrated in the enlarged detail x from FIG. 7. In FIG. 9, an alternative fastening technique is represented, one in which each individual roving 19 is fastened to the backing 18 by holding threads 20, 21. Both embodiments, as in FIG. 7 or in FIG. 9, may be used according to choice, even if only one of the variants is shown in the representations that follow.

In FIGS. 10 and 11 it is illustrated how the rovings 19 are fixed on the backing fibres 181, 182 by the holding threads 20, 21. In this way, the reinforcing fibres 191 are fixed by means of holding fibres 20, 21 on a surface area that forms a future wall surface of the holding part 7. In FIGS. 10 and 11 is the outline 183, which subsequently forms the periphery 73 of the intermediate component 71 (cf. FIG. 4). For this purpose, the backing 18 may be separated along the separating line 184 after the reinforcing fibres 191 have been applied completely.

It is also conceivable and possible for forming the periphery 73 of the later holding part 7 to fix the outline 183 by glueing by means of a bead of glue or welding, for example by means of a laser beam, and after that to carry out the separating operation along the separating line 184 running slightly outside.

Figures 12, 13:
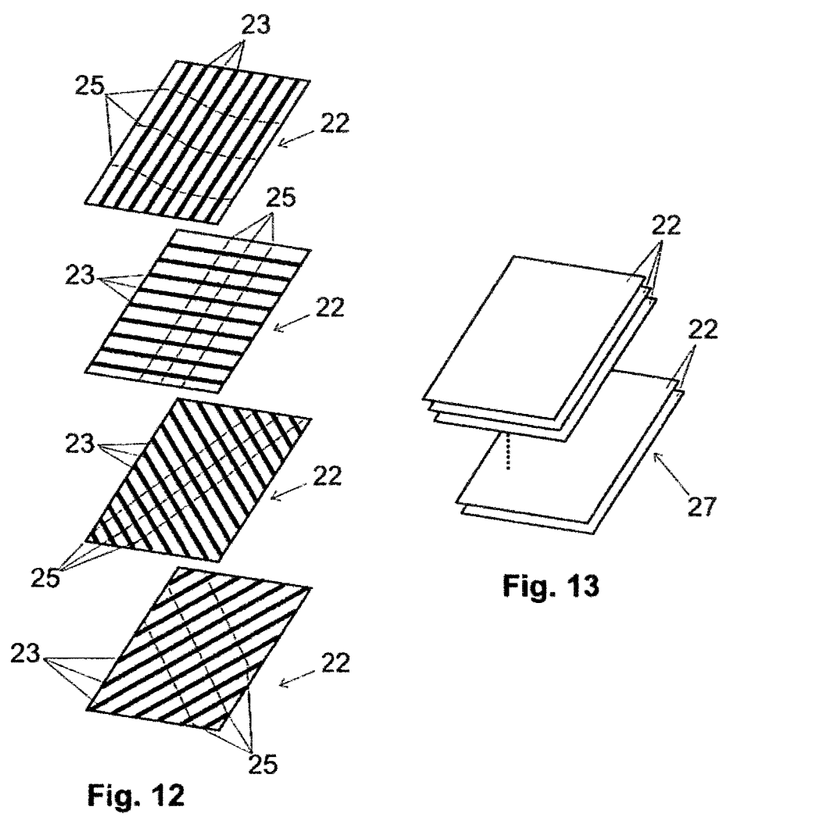
FIGS. 12-14 are a schematic representations of embodiments of structures for nonwoven scrims of the present disclosure.
Figure 14:
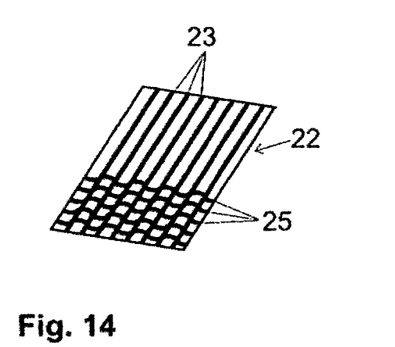
Figure 15:
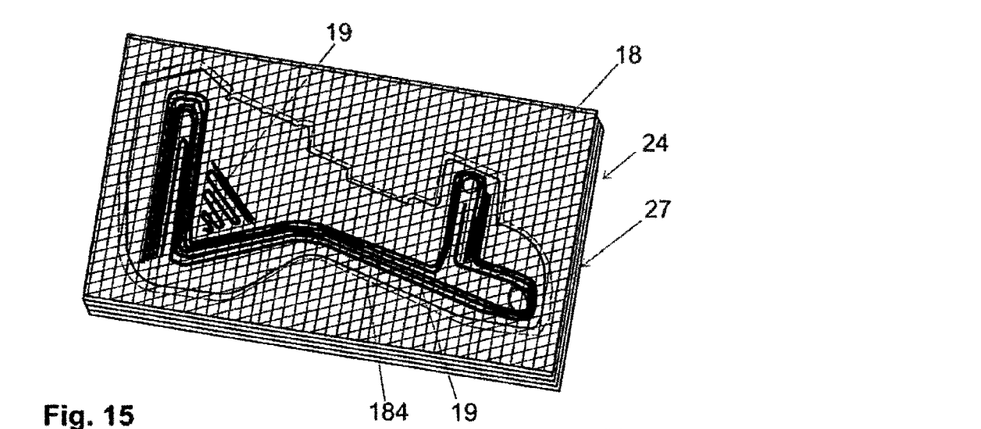
FIGS. 15-17 are schematic representations of steps in an embodiment of a method for presenting a holding part of the steering column, as disclosed herein.
Figure 16:
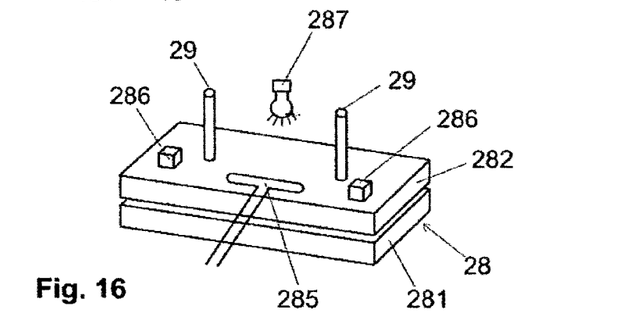

To increase the basic strength, it may be envisaged to provide before the further processing additional nonwoven scrims 22 consisting of nonwoven fibres 23 (cf. FIGS. 12, 13), which are grouped with the reinforcing fibres 19 to form a package 24. The nonwoven scrims 22 have nonwoven fibres 23 oriented parallel in each scrim, which may be connected to one another in a suitable way. For this purpose, scrim holding threads 25, as illustrated in FIG. 12, may be provided. It is also conceivable and possible to dispense with nonwoven holding fibres and, in a way corresponding to the representation of FIG. 14, provide further nonwoven fibres 26, which are oriented at an angle to the first nonwoven fibres 23 and fix the latter in the scrim 22 by corresponding loopings. FIG. 13 illustrates how multiple nonwoven scrims of which the nonwoven fibres are oriented in relation to one another at an angle greater than 0° are grouped to form a nonwoven package 27. This nonwoven package 27 may be packaged with the backing 18, in which the rovings 19 with the reinforcing fibres 191 are fastened, to form the package 24, as illustrated in FIG. 15. Advantageously, the separation along the separating line 184 only takes place after the forming of the package 24.

In the simplest case, this separation takes place when the package 24 is placed into the thermoforming and filling mould 28. The filling mould 28 has at least two filling openings 29, through which resin is injected and air can escape. At least one of the filling openings 29 may also serve as an overflow opening for excess resin introduced. Furthermore, the mould 28 has a lower mould 281 and an upper mould 282. The lower mould 281 and the upper mould 282 enclose a mould cavity 283, which has the topology of the intermediate component 71. The mould periphery 284 may be formed as a separating edge, which brings about the trimming of the package 24 along the separating line 184 when the mould halves are closed. For forming the component, the intermediate component 71, the upper mould 282 and the lower mould 281 are moved together after the package 24 has been placed into the mould cavity 283. In this case, the trimming described above can take place along the mould periphery 284. Following that, a synthetic resin is injected through at least one of the filling openings 29, the mould cavity being evacuated of air as completely as possible. Following that, the resin is cured.

For this, the resin is mixed with a hardener. This curing can take place by introducing an increased temperature and/or by introducing ultrasound and/or by introducing ultraviolet light into the mould cavity. Corresponding heating elements 285 and/or sonotrodes 286 and/or ultraviolet light sources (UV light sources) 287 may be provided for this. When forming the mould 28, a corresponding permeability for heat and/or ultrasound and/or ultraviolet light must be ensured.

Figure 4:
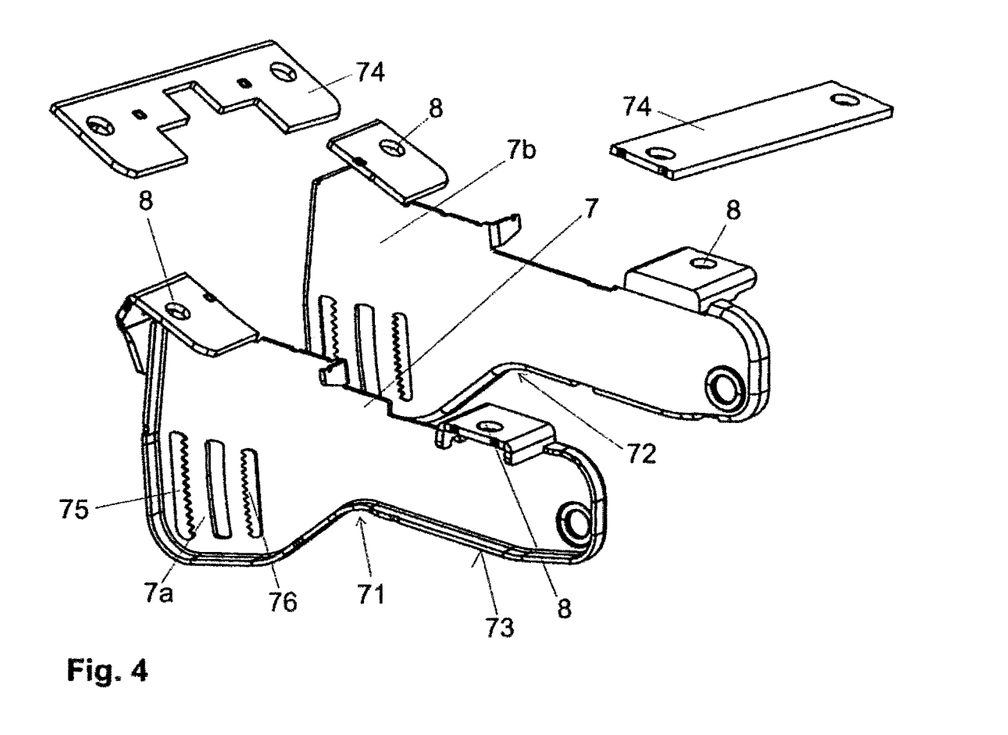
FIG. 4 is an isometric exploded view of an embodiment depicting preforming a fibre composite holding part of a steering column of the present disclosure.
Figure 17:
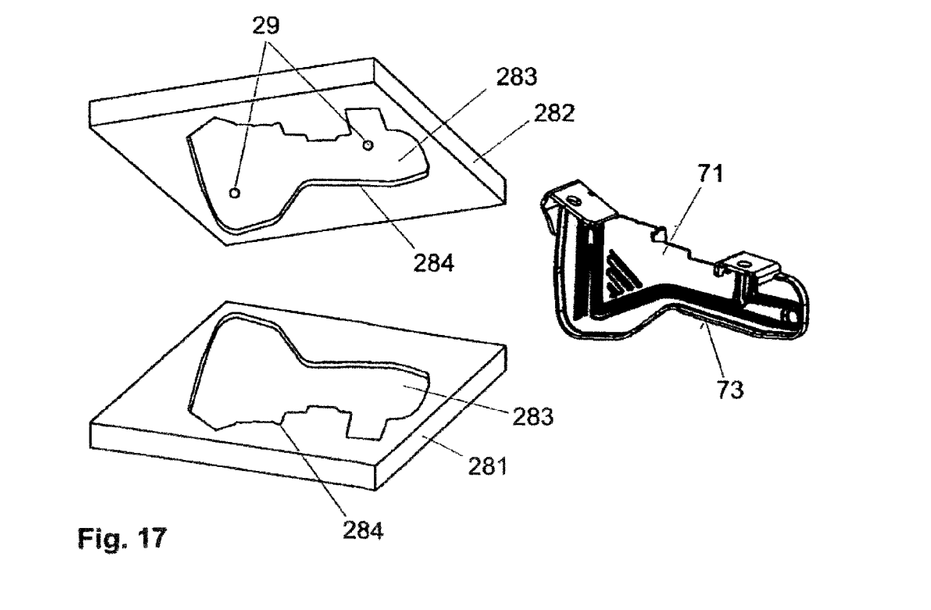
Figure 18:
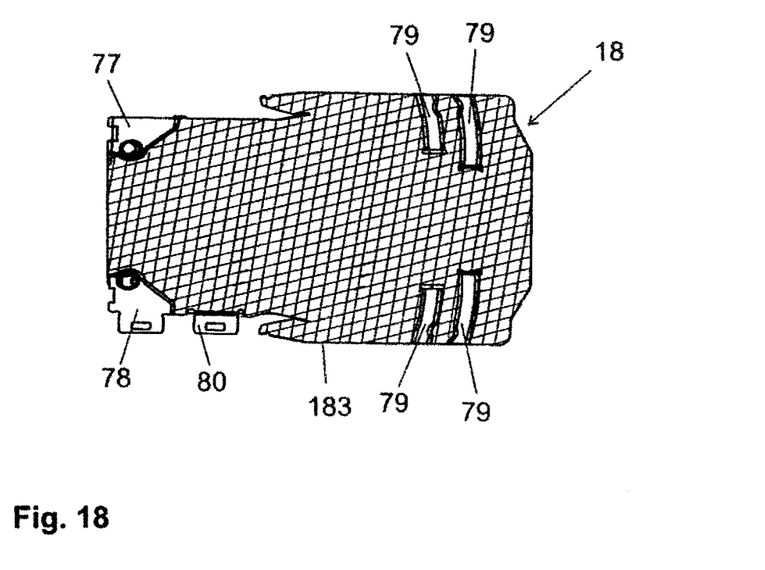
FIGS. 18-21 are schematic representations of steps in an embodiment of a method for presenting a swivel lever of the steering column, as disclosed herein.
Figure 19:
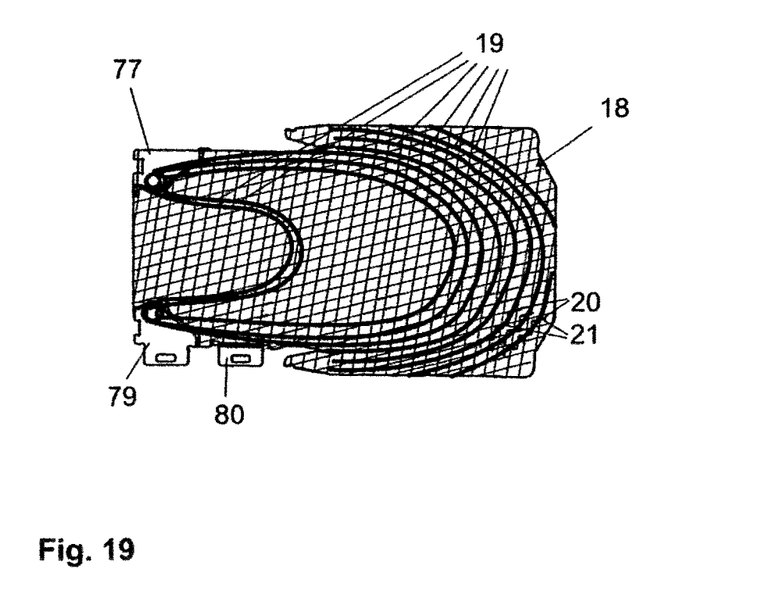
Figure 20:
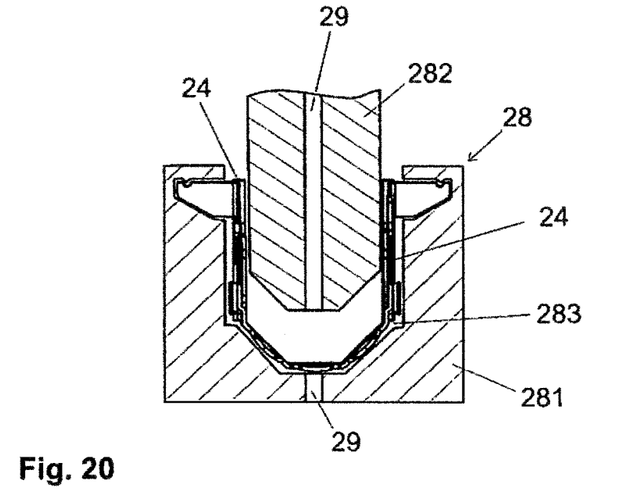

After completion of the crosslinking or the curing of the resin, the mould is opened, as illustrated in FIG. 17, and the intermediate component 71 is removed. As illustrated in FIG. 4, the second intermediate component is also provided in the same way and connected by connecting elements 74 to form the holding part 7.

Represented in the example corresponding to FIG. 4 are latching elements 75 and 76, which as functional elements can be placed with the package 24 into the mould cavity 283 of the mould 28 and be connected to the reinforcing fibres 191 during the impregnation with the resin. This embodiment is illustrated in FIG. 17.

FIGS. 18, 19, 20, 21 illustrate the representation of a swivel lever 5 corresponding to the invention. The production substantially takes place in the same way as the production of the holding part 7. The swivel axis reinforcement 77, 78 and the pressure rails 79 and in the example the cable holder 80 are positioned as functional elements on a backing 18 (cf. FIG. 18). An outline 183 forms the later periphery 53 of the swivel lever 5. The outline 183 may be cut out in one of the stages of production. Subsequently, preferably on the side of the carrier that is facing away from the functional elements, the reinforcing fibres 191 grouped into rovings 19 are fixed by holding fibres 20, 21 onto the backing (cf. FIG. 19). For reasons of overall clarity, in FIG. 19 the holding threads 20, 21, the lower holding thread 21 and the upper holding thread 20, are only shown in a small detail. The rovings 19 are fastened altogether on the backing 18 by the holding threads 20, 21. Also for forming the holding part 7, a packaging with additional nonwoven scrims 22 to form a package 24 may advantageously take place in a following method step. However, no scrims should cover the functional areas of the pressure rails.

Figure 21:
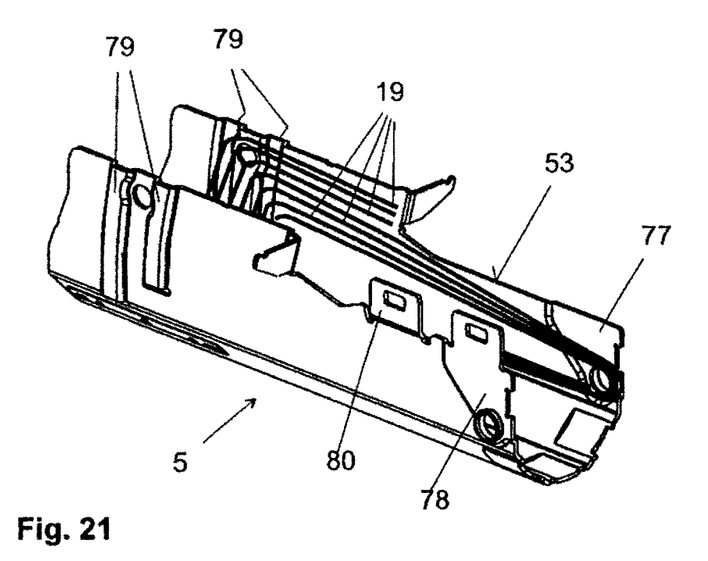

Correspondingly, all scrims are advantageously arranged on the side of the backing where the rovings are arranged. Subsequently, in a way corresponding to FIG. 20, the entire package 24 is placed into the mould 28 with the lower mould 281 and, as described above, encapsulated with resin. The mould cavity 283, which is enclosed by the upper mould 282 and the lower mould 281, has a shape which, seen in cross section, is substantially U-shaped. Here, too, it is conceivable and possible to carry out the trimming of the contour during the closing of the mould. The resin is introduced through the channels 29 and the air is let out through one of the channels 29. After the curing, the component is demoulded and possibly also subjected to further finishing steps. In the example, no finishing steps are required, and so the swivel lever 5 is formed directly. The appropriate choice of the functional elements has at least allowed the required degree of finishing to be reduced, if not rendered completely superfluous. In FIG. 21, the rovings 19 are illustrated in a schematized form, even though, depending on the application case, they are not visible on the surface of the finished component, since they are for example covered by the nonwoven package 27 or an opaque resin.

For the forming of the steering column, the individual components, of which at least one component contains reinforcing fibres, are assembled.

The invention claimed is:

1. A steering column for a motor vehicle, comprising:
a steering spindle bearing unit;
a steering spindle having a longitudinal axis, said steering spindle being rotatably mounted in said steering spindle bearing unit about said longitudinal axis;
a holding part configured to couple said steering spindle bearing unit to a body of the motor vehicle; and
a reinforcing element disposed integrally within an interior structure of a material from which at least one component of the steering column is made, said reinforcing element comprising,
a backing having a plurality of backing fibres woven together,
a plurality of reinforcing fibres disposed on said backing in a plane in at least one predefined path,
a plurality of holding fibres oriented at an angle to said predefined paths of said reinforcing fibres and configured to affix said reinforcing fibres to said backing, and which holding fibres enclose said reinforcing fibres.

2. The steering column of claim 1, wherein said reinforcing element further includes at least one nonwoven scrim comprising a plurality of parallel-oriented nonwoven fibres coupled together, on a surface of which scrim is arranged said reinforcing fibers disposed on said backing.

3. The steering column of claim 1, wherein said reinforcing element further includes at least two nonwoven scrims comprising a plurality of parallel-oriented nonwoven fibres coupled together, said at least two nonwoven scrims being disposed on opposing sides of said reinforcing fibers coupled to said backing.

4. The steering column of claim 3, wherein said nonwoven fibers in a first scrim are oriented at an angle to said nonwoven fibers in a second scrim.

5. The steering column of claim 1, wherein said reinforcing element is integrally disposed within a curable resin that forms said at least one component of the steering column.

6. A method of manufacturing a steering column, the steering column having a steering spindle that is rotatably mounted in a steering spindle bearing unit and a holding part configured to couple the steering spindle bearing unit to a body of a motor vehicle, wherein at least one component of the steering column is made from a fibre composite material, the method comprising:
weaving a backing from a plurality of backing fibers;
applying a plurality of reinforcing fibers onto a surface of the woven backing along predefined paths of stress profiles of a steering column component;
at least one of sewing or embroidering the reinforcing fibres to the woven backing by a plurality of holding fibres to form a reinforcing element;
introducing the reinforcing element into a mold configured to mold a reinforced component of the steering column;
filling the reinforcing element in the mold with a curable resin;
curing the resin in the reinforcing element to form a fibre reinforced composite component of the steering column;
assembling the fibre reinforced composite component with other of the components to form a steering column.

7. A method of manufacturing a steering column, the steering column having a steering spindle that is rotatably mounted in a steering spindle bearing unit and a holding part configured to couple the steering spindle bearing unit to a body of a motor vehicle, wherein at least one component of the steering column is made from a fibre composite material, the method comprising:
weaving a backing from a plurality of backing fibers;
applying a plurality of reinforcing fibers onto a surface of the woven backing along predefined paths of stress profiles of a steering column component;
at least one of sewing or embroidering the reinforcing fibres to the woven backing by a plurality of holding fibres to form a reinforcing element;

applying the reinforcing element to at least one nonwoven scrim made of parallel-oriented nonwoven fibres connected together, so as to form a reinforcing package;

introducing the reinforcing package into a mold configured to mold a reinforced component of the steering column;

filling the reinforcing package in the mold with a curable resin;

curing the resin in the reinforcing package to form a fibre reinforced composite component of the steering column;

assembling the fibre reinforced composite component with other of the components to form a steering column.

8. The method of claim 7, wherein prior to said filling step, one or more functional elements are positioned in the mold at predefined locations so as to be connected to the reinforcing fibres in a one piece fibre reinforced composite component after said filling and curing steps.

9. The method of claim 8, further comprising trimming the reinforcing package at its periphery, at least during said introducing step at the latest, so as to cut said reinforcing package to have a predetermined circumferential contour.

10. The method of claim 8, further comprising providing the reinforcing package with clearances required for functions of the fiber reinforced composite component, at least during said introducing step at the latest.

\* \* \* \* \*